Patented Sept. 5, 1922.

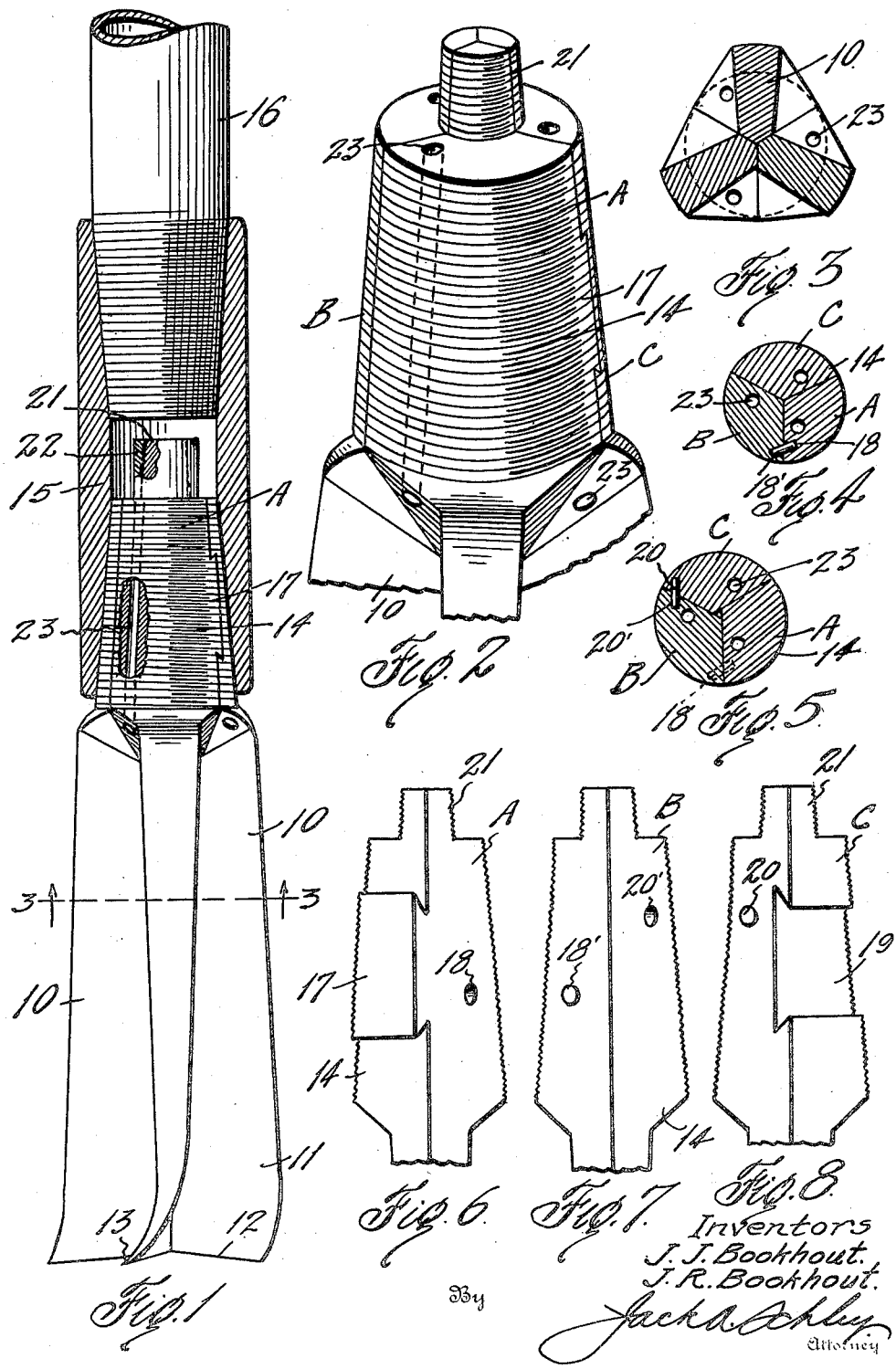

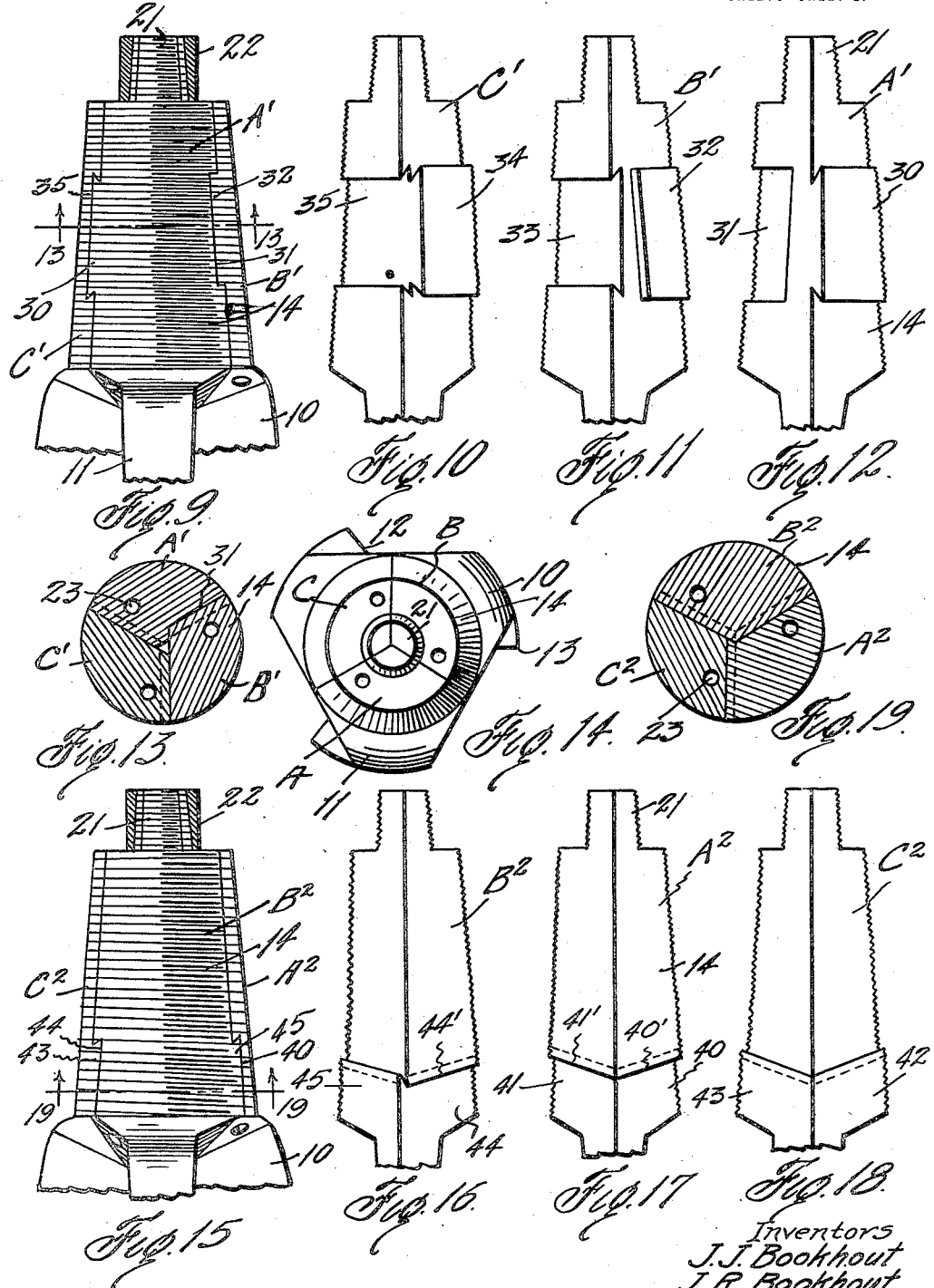

1,428,137

UNITED STATES PATENT OFFICE.

JOHN J. BOOKHOUT AND JAMES R. BOOKHOUT, OF DALLAS, TEXAS.

MULTIPLE-CUTTER DRILL BIT.

Application filed August 1, 1921. Serial No. 489,076.

*To all whom it may concern:*

Be it known that we, JOHN J. BOOKHOUT and JAMES R. BOOKHOUT, citizens of the United States, residing at Dallas, in the county of Dallas and State of Texas, have invented certain new and useful Improvements in Multiple-Cutter Drill Bits, of which the following is a specification.

This invention relates to new and useful improvements in multiple cutter drill bits.

The object of the invention is to provide a drill having a plurality of detachably connected cutter blades and involving certain novel features which make for a faster cutting tool which will drill and maintain a straight and round hole.

A particular feature of the invention resides in the head construction of the bit, whereby the sectors which form the head are assembled in such a manner as to be held against longitudinal and lateral displacement. A further feature resides in an arrangement and engagement of the head sectors so as to substantially eliminate torsional strain in breaking out the drill and preventing the head of the drill from becoming wedged in the pipe collar or tool joint. Another advantage of the invention resides in the construction of the cutting blade with an outward flare, whereby each blade is given an increased bearing or riding surface in the hole which is drilled.

A construction designed to carry out the invention will be hereinafter described together with other features of the invention.

The invention will be more readily understood from a reading of the following specification and by reference to the accompanying drawings, in which an example of the invention is shown and wherein:

Fig. 1 is a view in elevation of a tool constructed in accordance with our invention, and connected with a drill pipe by an ordinary collar, which latter is shown in section, Fig. 2 is an isometric view of the upper portion of the drill bit with the retaining collar removed, Fig. 3 is a cross sectional view on the line 3—3 of Fig. 1, Fig. 4 is a cross sectional view through the head showing one of the dowel pins, Fig. 5 is a cross sectional view through the head at a different elevation from Fig. 4, and showing one of the other dowel pins.

Figs. 6, 7 and 8 are elevations of the inner faces of the head sector,

Fig. 9 is an elevation of the upper portion of a modified form of head structure, Figs. 10, 11 and 12 are elevations of the inner faces of said head sections, Fig. 13 is a cross sectional view on the line 13—13 of Fig. 9, Fig. 14 is a plan view of the bit, all forms of which appear the same in plan, Fig. 15 is an elevation of the upper portion of another modified form of head, Figs. 16, 17 and 18 are elevations of the inner faces of said head sections, and Fig. 19 is a section on line 19—19 of Fig. 15.

In the drawings the numeral 10 designates a blade section, three or more of which are used in forming a bit in accordance with our invention. Each blade section comprises a cutter blade 11 disposed vertically and radially and terminating at its lower end in a laterally directed cutter 12 which is given a considerable curve in a clockwise direction and gradually reduced in thickness to its cutting edge. The cutting edge of the blade is slightly inclined upwardly toward the center of the bit. This construction produces a cutting point 13 at the outer edge of the cutter. By inclining the cutting edges inwardly and upwardly a slight conical formation will be given to the surface which is worked upon, thus tending to center the bit in the hole. It is obvious that by providing a plurality of cutters, the bit will be prevented from being displaced laterally and this will assure a round and straight hole.

At its upper end each blade section 10 is surmounted by a head sector 14 and these sectors when assembled produce an angular and upwardly tapered externally screw threaded head which may be screwed into the lower end of a drill collar or other connection 15, which is usually mounted on the lower end of a drill pipe or tool shank 16. This invention has particularly to do with the means and manner of connecting the head sectors and holding the blades in proper relation. It will be noted by observing Fig. 3, that the inner vertical edges of the blades are beveled so as to contact and support each other, but as the blade structure forms the subject matter of a companion application executed of an even date herewith, the details of construction will not be herein described.

We have shown three of the head sectors and designated the same by the letters A, B and C. It is important that the blades as well as the sectors be properly connected and held against relative longitudinal displacement. As shown in Fig. 3 the inner beveled edges of the blades contact and as illustrated in Figs. 4 and 5, the head sectors are in close engagement, so that a compact structure is had.

The sector A is provided with a dove-tail lug 17 on one of its angular faces, while its other angular face has a socket 18. In assembling the head the dove-tail 17 is slid into a dove-tail seat 19 in one of the faces of the sector C. The other angular face of the sector C is provided with an outwardly projecting dowel pin 20. The sector B has on one of its angular faces an outwardly projecting dowel pin 18' and is provided in its other angular face at a higher elevation with a socket 20'.

In assembling the blade sectors, B, and C, are first brought into contact so that the dowel pin 20 enters the socket 20'. The pin 20 is disposed at less than a right angle to the face of the sector C as is shown in Fig. 5. The sector A forms a key which fastens the other parts together. In placing the sector A, the lug 17 is inserted in the outer end of the seat 19 and said sector A slid along the face of the sector C so that the dowel pin 18' is reecived in the socket 18. The dowel pin 18 is disposed at an angle less than a right angle to the adjacent face of its sector and substantially parallel to the face of the sector C in which the seat 19 is provided. By this arrangement the sectors cannot be displaced radially as the movement undergone by the sector A when it is assembled or removed from the head, is substantially tangential. The angular disposition of the dowel pins 18' and 20 hold the sectors against radial displacement, in which they are assisted by the lug 17 and seat 19.

Each sector is surmounted by a reduced stud 21 which is preferably tapered and externally screw threaded. When the sectors are assembled the studs produce a circular member which receives a retaining ring 22. This retaining ring locks the sector A in place. The lug 17 and dowel pins hold the sectors against longitudinal displacement and a very strong and substantial head structure is produced. Each sector is provided with a vertical water course or port 23 which has its lower end discharging onto the advance side of the cutter blade 10. The advantage of this arrangement is that the water will be directed down the face of the blade and onto the cutters 12, but the character and location of the water courses is optional and may be employed and located as found most desirable.

In Figs. 9 to 13 we have shown a modified form of head construction in which dowel pins are not used. The sector A' is provided with a dove-tail lug 30 on one face and a rectangular socket 31 on its other angular face. The sector B' is provided on one angular face with a rectangular lug 32 adapted to fit in the socket 31; while its other angular face is provided with a dove-tail seat 33 adapted to receive a dove-tail lug 34 on one of the angular faces of the sector C'. The other angular face of the sector C' is provided with a dove-tail seat 35 adapted to receive the lug 30.

In assembling this head the lug 34 of the sector C' is slid into the seat 33. The key sector A' is then placed in position by inserting the lug 30 in the outer end of the seat 35 and sliding said sector until the lug 32 enters the socket 31. These sectors also have the studs 21 which are fastened by the ring 22 as before described. This form of construction is particularly strong and the sectors are well braced against the different strains incidental to the use of the drill bit.

Figs. 15 to 19 illustrate a second modification of the invention. The sector A² is provided on each of its angular faces with undercut sockets 40 and 41 respectively, the socket 40 having an overhanging inwardly and upwardly beveled lip 40' while a similar lip 41' overhangs the socket 41. The sector C² has at its lower portion projecting lugs 42 and 43 respectively, located on its angular faces and having their upper edges inwardly beveled. The sector B² has a socket 44 on one of its angular faces and a projecting lug 45 on its other angular face. An overhanging beveled lip 44' is provided over the recess and the upper edge of the lug 45 is also beveled. The lips as well as the upper edges of the lugs are inclined toward the center of the sectors as is clearly shown in the drawings.

In assembling the sectors, B² and C² are first brought together so that the lip 44' engages over the upper edge of the lug 43. The key sector A² is then brought into position so that its lip 40' engages over the upper end of the lug 45 which latter is received in the socket 40 and the lip 41' engages over the upper edge of the lug 42 which latter is received in the socket 41. The beveled lip and edges of the lugs tend to prevent lateral displacement of the sectors, which are, of course, fastened together by the ring 22 engaging the studs 21 the same as in the other figures. It is obvious that various forms of connecting the head sectors together could be constructed and the invention is not to be limited to any particular form.

It is pointed out that the cutters 12 will wear and the blades must be sharpened and new cutters formed thereon. It would be practically impossible to sharpen the blades in their assembled relation. It is merely necessary to remove the ring 22 and then displace the key sector and its blades from the other sectors and blades to disassemble the bit. By this arrangement the blades may be expeditiously sharpened and reassembled at a minimum expense and in a highly satisfactory manner. If one of the blades should be broken it can be easily replaced and it is not necessary to replace the entire drill. It will be seen that the cutter 12 may be given any desired shape in accordance with the work to be done.

When the blades are assembled as described, the head sectors will be fastened together in a secure and substantial manner and will resist the different strains to which a tool of this character is subjected, not only when in operation, but when being removed and placed in the drill collar 15. It has been found that a more ample connection between the sectors than simple dowel pins is desirable in order that a practical drill may be had.

What we claim, is:

1. A well drilling bit comprising a plurality of blade sections, each including a vertical and radial blade having a cutter at its lower end and a shouldered head sector at its upper end, one of said sectors having a socket and an adjacent sector having a lug engaging in said socket, and means for fastening the sectors together.

2. A well drilling bit comprising a plurality of blade sections, each including a vertical and radial blade having a cutter at its lower end and a shouldered head sector at its upper end, one of said head sectors having a socket and an adjacent sector having a lug engaging in said socket, and means for fastening the sectors together, each head sector having a water course discharging onto the advance side of its blade.

3. A well drilling bit comprising a plurality of blade sections, each including a vertical and radial blade having a cutter at its lower end and a shouldered head sector at its upper end surmounted by a reduced stud, one of said head sectors having a socket and an adjacent sector having a lug engaging in said socket, and a retaining ring uniting the studs and fastening the sectors together.

4. A well drilling bit comprising a plurality of blade sections, each including a vertical and radial blade having a cutter at its lower end and a shouldered head sector at its upper end surmounted by a reduced stud, one of said head sectors having a socket and an adjacent sector having a lug engaging in said socket, a retaining ring uniting the studs and fastening the sectors together, and water courses 1 extending through each sector and discharging onto the advance side of its blade section.

5. A well drilling bit comprising a plurality of blade sections, each including a vertical and radial blade having a cutter at its lowered end and a shouldered head sector at its upper end, one of said sectors having a socket provided with a beveled edge extending radially of the drill and another of said sectors having a lug fitting in said socket and provided with a beveled edge engaging the beveled edge of the socket.

6. A well drilling bit comprising a plurality of blade sections, each including a vertical and radial blade having a cutter at its lower end and a shouldered head sector at its upper end, one of said sectors having a socket provided with a beveled edge extending radially of the drill and another of said sectors having a lug fitting in said socket and provided with a beveled edge engaging the beveled edge of the socket, and means for fastening the sectors together.

7. A well drilling bit comprising a plurality of blade sections, each including a vertical and radial blade having a cutter at its lower end and a shouldered head sector at its upper end, one of said sectors having a socket provided with a beveled edge extending radially of the drill and another of said sectors having a lug fitting in said socket and provided with a beveled edge engaging the beveled edge of the socket, and means for fastening the sectors together, all of said sectors having interengaging parts co-acting between their contacting faces.

In testimony whereof we affix our signatures.

JOHN J. BOOKHOUT.
JAMES R. BOOKHOUT.